United States Patent Office 3,160,586
Patented Dec. 8, 1964

3,160,586
WATER PURIFICATION PROCESS
James B. Duke, Metuchen, N.J., assignor to Minerals & Chemicals Philipp Corporation, Menlo Park, N.J., a corporation of Maryland
No Drawing. Filed Feb. 28, 1963, Ser. No. 261,857
12 Claims. (Cl. 210—44)

This invention relates to the clarification of latex wash waters and to the recovery of rubber therefrom.

Latex wash waters are dilute aqueous dispersions of millimicron size rubber particles. They result from a washing step in the production of rubber goods from latexes, and comprise rubber particles which have not coagulated in the forming process. The latex wash waters are extremely stable dispersions. Even with prolonged standing, little if any rubber solids precipitate out of latex wash waters. Moreover, the dispersed rubber particles in the effluent washings cannot be coagulated effectively with the usual rubber coagulants and then filtered to recover the rubber particles from the aqueous phase.

Since latex wash waters are white and opaque, even when they are extremely dilute, they impart a very objectionable milky appearance to bodies of water when they are dumped in these bodies without a preliminary clarification treatment. The disposal of latex wash waters is therefore a very serious problem to many rubber processors. Furthermore, the value of the rubber lost in latex wash waters is considerable in many plants.

Accordingly, an object of this invention is the provision of a simple and inexpensive method for separating colloidally dispersed rubber particles from the aqueous phase of latex wash liquids, whereby the solids can be recovered and reused.

A further and important object is the provision of a method for effecting the substantially complete separation of rubber colloids from the aqueous phase of latex wash waters, whereby the clarified waste liquid can be disposed of in bodies of water without imparting objectionable color thereto.

Another object of this invention is the provision of a method for floating rubber colloids that are dispersed in latex wash waters.

Stated briefly, in accordance with this invention rubber colloids are floated from a latex wash water by incorporating a small quantity of a hydrophobic organic amine into the rubber latex wash water, agitating the wash water, and then aerating the wash water, whereby the rubber solids originally dispersed in the latex wash water float on the surface of the wash water as a froth. The froth, which is a concentrate of rubber particles originally colloidally dispersed in the latex washings, are then separated from the remainder, which is a wash water of improved clarity.

This process can be employed to recover rubber values present in latex washings. When the process is carried out in a manner such that substantially complete rubber flotation is achieved, the flotation tailings can be dumped into bodies of water without creating a pollution problem.

In accordance with a preferred embodiment of this invention, the addition of amine to the latex wash water is carried out in stages. In other words, a portion of the total amine required to effect substantial clarification of the latex wash water is added with agitation to the wash water and then the wash water is aerated and a float product removed. This procedure is repeated at least one more time until addition of amine indicates that all of the rubber particles have already been floated from the water. In carrying out the process with stage addition of amine reagent, substantially all of the dispersed rubber particles can be floated from the latex wash water. As a result, substantially complete recovery of the rubber content of the dilute latex is realized simultaneously with substantially complete clarification of the water.

It was indeed surprising and unexpected that dispersed rubber particles in latex wash waters could be effectively separated from the wash waters by froth flotation since the prior art teaches that froth flotation is generally applicable only to particles in the plus 200 mesh size range. In contrast with usual flotation feed which is coarse enough to be retained on a 200 mesh screen, rubber particles in a typical latex wash water have colloidal dimensions. The results realized with amine flotation of rubber colloids were also surprising because of the highly successful flotation of rubber particles that could be obtained even when extremely dilute latex wash waters were treated.

The latex wash waters to which the process of the subject invention is applicable can be wash waters obtained in the processing of any rubber latex; such as, for example, natural rubber latex, synthetic rubber latex, such as butadiene-styrene latex, and mixed natural and synthetic latexes. The invention is of special commercial value in the processing of wash waters obtained in the production of foamed rubber goods from GR–S latex.

The rubber solids content of the latex wash waters vary considerably from plant to plant and may vary from day to day with the same operation in a rubber processing plant. The solids may be as low as a fraction of a percent or as high as 5 percent or more. As mentioned, the size of the rubber particles in these wash waters is, for the most part, in the millimicron size range. Normally these washings are slightly acidic.

The hydrophobic organic amine flotation reagent employed in carrying out the latex wash water treatment of this invention is preferably a primary amine in which the alkyl group is derived from a fatty acid, i.e., a n-primary amine containing from 8 to 20 carbon atoms. Especially preferred are n-primary fatty amines containing 12 to 18 carbon atoms. Suitable primary fatty amines are available commercially in distilled, undistilled or still bottom grades and are obtained from tall oil fatty acids, caprylic acid, capric acid, lauric acid, myristic acid, palmitic acid, stearic acid and mixed acids from soybean oil, coconut oil, tallow and hydrogenated tallow. The fatty acid or mixture of fatty acids is converted into a nitrile by reaction with ammonia and the nitrile is subjected to catalytic hydrogenation at about 150° C. to produce a material consisting of about 85 percent primary amine, with the balance secondary amine and minor quantities of tertiary amine. Since the preferred fatty amines have low solubility, it is preferable to use the fatty amine in the form of a salt of a water-soluble acid which can be an organic or an inorganic acid, preferably acetic acid.

Other hydrophobic organic amine flotation reagents include secondary fatty amines, especially those containing 12 to 20 carbon atoms, quaternary ammonium salts such as cetylpyridium ammonium chloride and dimethyldioctadecyl ammonium acetate, amidoamines, such as those obtained by condensation of ethylene diamine and higher fatty acids, and N-aliphatic alkylene polyamines such as N-tallow trimethylene diamine.

It is recommended to dissolve or disperse the hydrophobic amine (especially the salt of the hydrophobic amine) in water before adding the amine to the latex washings. By way of example, a solution or dispersion of 1 to 10 percent amine salt concentration is suitable.

The quantity of amine employed will vary with the solids content of the latex washings. The total amount of amine that is used should be sufficient to flocculate all of the solids in the washings. This quantity can be readily determined by visual observation of the washings after addition of successive increments of amine. With most latex wash waters, the amount of amine required will be within the range of about 1 to about 15 pounds per ton of latex wash water.

In putting the invention into practice, the hydrophobic amine is added to the latex liquid and then agitated (conditioned), resulting in a rapid flocculation of the rubber colloids. Conditioning time can be very short, such as periods with the range of a few seconds to about two minutes. When conditioning time is excessive, the colloids that have been flocculated by amine addition will tend to coalesce. The coalesced particles do not float as well as flocs which have not coalesced. Thus, agitation of the amine flotation reagent in the washings should preferably be for a time sufficient to flocculate dispersed particles in the latex but insufficient to permit appreciable coagulation of the flocs. After agitating the amine in the washing, air is bubbled through the liquid until substantially all of the flocs float on the surface of the liquid as a froth. This froth is removed from the liquid as it is formed. The product of the flotation step, which is a coagualted concentrate of rubber particles originally present in colloidally dispersed condition in the washings, can be reused, if desired, or discarded. The underflow of the flotation process, which is a waste washing of improved clarity, can be dumped into any suitably body of water without further treatment, especially when stage addition of amine is practiced.

Any agitated vessel can be used to mix the amine uniformly into the latex wash liquid. This step, as well as the aeration and flotation, can be carried out in conventional flotation equipment, such as is used in flotation of mineral ores.

In some instances, an initial scum can be floated from the latex wash water without addition of amine reagent by aerating the water in a suitable flotation cell and removing latex solids as a scum. The tailings of this flotation operation is then conditioned with amine, as described above, and then aerated and floated.

As mentioned, the amine flotation reagent is preferably incorporated into the washings by stage agitation. Thus, in carrying out the preferred form of this invention, amine is initially added to the washings in amount sufficient to flocculate only a portion of the dispersed phase of the latex washings. The washings are then agitated, aerated and a froth product removed. Additional amine is then added to the residue of this flotation step followed by agitation, aeration and froth removal. The procedure is repeated until substantially no flocs are formed when the amine flotation reagent is agitated in the residue. The various froth products can be combined when the rubber values are to be reused.

The following examples are given to illustrate the application of the process of this invention to the treatment of an extremely dilute latex wash water from a foam rubber plant. It will be distinctly understood that these examples are illustrative only and that variation in specific operating conditions, reagents and reagent quantities can be employed within the scope of the appended claims.

The latex wash water employed in these examples is reported to contain 0.424 percent by weight latex solids. Particle size measurements of the dispersed rubber particles in the wash water showed that 50 percent of the particles had diameters within the range of 500 to 1200 Angstrom units and 50 percent had diameters within the range of 1200 to 5000 Angstrom units. The wash water was a white and opaque dispersion, resembling a dilute milk solution. This negatively charged dispersion was very stable and a sample showed substantially no evidence of sediment formation after standing at ambient temperature for a month.

*Example I*

The latex wash water was clarified by flotation with stage addition of amine flotation reagent to a refractive index of 1.000 (the refractive index of distilled water). The following procedure was used.

Four hundred and seventy grams of the latex water was put into a 100 gm. Minerals Separation Sub A flotation machine. 1.87 ml. of a 2.5 percent aqueous solution of the acetate salt of the 18 carbon atom amine derived from tallow fatty acids (Armac T) was added and the charge in the flotation cell was agitated for 15 seconds with the air off. Air was admitted to the flotation cell and a froth product removed for 1 minute. Another 1.87 ml. of the 2.5 percent solution of Armac T was then added to the flotation machine and the charge agitated for 15 seconds with the air off. Air was admitted and the charge was frothed for a minute. This operation was repeated one more time, producing a sparkling clear machine discharge product, which represented an 80% recovery of the starting latex washings.

*Example II*

Four hundred and seventy ml. of latex wash water were put into the 100 gm. Minerals Separation Sub A flotation machine and 5.6 ml. of the 2.5 percent aqueous solution of Armac T were added. The wash water was agitated (air off) for 1½ minutes and then aerated and frothed for 1½ minutes, removing a concentrate of rubber particles. The machine discharge product of this flotation was slightly murky, with a refractive index of about 1.331.

A comparison of this result of this example in which the flotation reagent was added in one charge with the results of the previous example, in which flotation was carried out with stage addition of amine reagent, shows that the flotation results were markedly superior with stage addition of flotation reagent.

I claim:
1. A method for concentrating rubber particles in latex wash water which comprises
   mixing a hydrophobic amine with agitation into latex wash water containing dispersed particles of rubber, said particles having colloidal dimensions,
   incorporating air bubbles into said wash water, thereby forming a froth product which is a concentrate of rubber particles originally dispersed in said wash water and a residue which is a wash water of improved clarity,
   and separating said froth product from said residue.
2. A method for concentrating rubber particles in latex wash water which comprises
   mixing a salt of a n-primary fatty amine containing from 8 to 20 carbon atoms and a water soluble acid with agitation into latex wash water containing dispersed particles of rubber, said particles having colloidal dimensions,
   incorporating air bubbles into said wash water, thereby forming a froth product which is a concentrate of rubber particles originally dispersed in said wash water and a residue which is a wash water of improved clarity,
   and separating said froth product from said residue.
3. A method for concentrating rubber particles in latex wash water which comprises
   mixing an acetate salt of a n-primary fatty amine containing from 12 to 18 carbon atoms with agitation into latex wash water containing dispersed particles of rubber, said particles having colloidal dimensions,
   incorporating air bubbles into said wash water, thereby forming a froth product which is a concentrate of rubber particles originally dispersed in said wash water and a residue which is a wash water of improved clarity,
   and separating said froth product from said residue.

4. A method for concentrating rubber particles in latex wash water which comprises
mixing a hydrophobic amine with agitation into latex water containing dispersed colloidally dimensioned particles of rubber, using a sufficient quantity of amine to flocculate dispersed rubber particles,
incorporating air bubbles into said wash water, thereby forming a froth product which is a concentrate of flocculated rubber particles and a residue which is a wash water of improved clarity,
and separating said froth product from said residue.

5. A method for concentrating rubber particles in latex wash water which comprises
mixing a salt of a n-primary fatty amine containing from 12 to 20 carbon atoms and a water soluble acid with agitation into latex water containing dispersed colloidally dimensioned particles of rubber, the quantity of amine being sufficient to flocculate dispersed rubber particles,
incorporating air bubbles into said wash water, thereby forming a froth product which is a concentrate of flocculated rubber particles and a residue which is a wash water of improved clarity,
and separating said froth product from said residue.

6. A method for clarifying latex wash water which comprises
incorporating a salt of a hydrophobic amine and a water soluble acid with agitation into latex wash water containing dispersed rubber particles having millimicron size dimensions, the quantity of said amine being sufficient to flocculate only a portion of said dispersed rubber particles,
incorporating a multiplicity of finely divided air bubbles into said wash water, thereby forming a froth product which is a concentrate of flocculated rubber particles that were originally dispersed in said wash water and a residue which is a wash water of improved clarity,
removing said froth from said residue,
incorporating additional salt of a hydrophobic amine and a water soluble acid into said residue with agitation, using sufficient of said amine salt to flocculate rubber particles originally dispersed therein,
incorporating a multiplicity of finely divided air bubbles into said residue containing flocculated rubber particles, thereby forming a froth product which is a concentrate of rubber particles originally dispersed in said residue and a residue which is a wash water of further improved clarity,
and repeating the treatment of said residue in said fashion until substantially no rubber particles flocculate upon addition of said amine salt thereto, whereby said residue is substantially free of rubber particles.

7. The method of claim 6 in which said hydrophobic amine is a n-primary fatty amine containing from 8 to 20 carbon atoms.

8. The method of claim 6 in which said salt of a hydrophobic amine is the acetate salt of a n-primary fatty amine containing 18 carbon atoms.

9. A method for clarifying latex wash water which comprises
incorporating an aqueous solution of a salt of a n-primary fatty amine having from 12 to 20 carbon atoms and a water soluble acid into latex wash water containing dispersed rubber particles having millimicron size dimensions, the quantity of amine salt being sufficient to flocculate only a portion of said dispersed rubber particles,
agitating said latex wash water for a time within the range of from a few seconds and not to exceed about two minutes,
incorporating a multiplicity of finely divided air bubbles into said wash water, thereby forming a froth product which is a concentrate of flocculated rubber particles that were originally dispersed in said wash water and a residue which is a wash water of improved clarity,
removing said froth from said residue,
incorporating an additional quantity of said amine salt into said residue, using sufficient amine salt to flocculate rubber particles originally dispersed therein,
agitating said residue for a time within the range of from a few seconds and not to exceed about two minutes,
incorporating a multiplicity of finely divided air bubbles into said residue containing flocculated rubber particles, thereby forming a froth product which is a concentrate of rubber particles originally dispersed in said residue and a residue which is a wash water of further improved clarity,
and repeating the treatment of the residue in said fashion until substantially no rubber particles flocculate upon addition of said amine salt thereto, whereby said residue is substantially free of rubber particles.

10. The method of claim 9 in which said amine salt is an acetate salt of a n-primary fatty amine containing 18 carbon atoms.

11. The method of claim 9 in which said dispersed rubber particles comprise a butadiene-styrene copolymer.

12. The method of claim 9 in which said dispersed rubber particles comprise a butadiene-styrene copolymer and said amine salt is an acetate salt of a n-primary fatty amine containing 18 carbon atoms.

References Cited in the file of this patent

UNITED STATES PATENTS

| | | |
|---|---|---|
| 1,426,596 | Peck | Aug. 22, 1922 |
| 2,410,633 | Counselman | Nov. 5, 1946 |
| 2,578,040 | Booth et al. | Dec. 11, 1951 |
| 2,995,512 | Weidner et al. | Aug. 8, 1961 |

FOREIGN PATENTS

| | | |
|---|---|---|
| 567,151 | Great Britain | Jan. 31, 1945 |

OTHER REFERENCES

Hansen et al.. Sewage Treatment by Flotation, Sewage Works J., vol. 15, March 1943, pp. 242–252.